US009406562B2

(12) United States Patent
Bonn et al.

(10) Patent No.: US 9,406,562 B2
(45) Date of Patent: Aug. 2, 2016

(54) INTEGRATED CIRCUIT AND DESIGN STRUCTURE HAVING REDUCED THROUGH SILICON VIA-INDUCED STRESS

(75) Inventors: Jeffrey P. Bonn, Essex Junction, VT (US); Brent A. Goplen, Underhill, VT (US); Brian L. Kinsman, Essex Junction, VT (US); Robert M. Rassel, Colchester, VT (US); Edmund J. Sprogis, Williston, VT (US); Daniel S. Vanslette, Fairfax, VT (US)

(73) Assignee: GlobalFoundries, Inc., Grand Cayman (KY)

( * ) Notice: Subject to any disclaimer, the term of this patent is extended or adjusted under 35 U.S.C. 154(b) by 678 days.

(21) Appl. No.: 13/005,883

(22) Filed: Jan. 13, 2011

(65) Prior Publication Data
US 2012/0181700 A1 Jul. 19, 2012

(51) Int. Cl.
*H01L 23/48* (2006.01)
*H01L 21/768* (2006.01)
*G06F 17/50* (2006.01)

(52) U.S. Cl.
CPC ...... *H01L 21/76898* (2013.01); *G06F 17/5068* (2013.01); *H01L 23/481* (2013.01); *G06F 2217/80* (2013.01); *H01L 2924/0002* (2013.01)

(58) Field of Classification Search
CPC ............ H01L 23/481; H01L 21/76898; H01L 2217/80; H01L 2924/0002; G06F 17/5068
USPC .................... 257/774, E23.011; 716/100, 119
See application file for complete search history.

(56) References Cited

U.S. PATENT DOCUMENTS

| | | | |
|---|---|---|---|
| 4,686,629 A | 8/1987 | Noto et al. | |
| 5,031,111 A | 7/1991 | Chao et al. | |
| 5,144,563 A | 9/1992 | Date et al. | |
| 6,271,548 B1 | 8/2001 | Umemoto et al. | |
| 7,205,639 B2 | 4/2007 | Hierlemann et al. | |
| 7,528,006 B2 | 5/2009 | Arana et al. | |
| 7,542,891 B2 | 6/2009 | Lin et al. | |
| 7,712,064 B2 | 5/2010 | Scheffer et al. | |
| 7,933,746 B2 * | 4/2011 | Kennedy | G06Q 30/02 703/1 |
| 2007/0202662 A1 | 8/2007 | Lin et al. | |
| 2007/0202663 A1 | 8/2007 | Moroz et al. | |

(Continued)

OTHER PUBLICATIONS

Do, Notice of Allowance and Fee(s) Due for U.S. Appl. No. 12/555,981 dated Nov. 7, 2011, 9 pages.

(Continued)

*Primary Examiner* — Vongsavanh Sengdara
(74) *Attorney, Agent, or Firm* — David Cain; Hoffman Warnick LLC

(57) ABSTRACT

Embodiments of the invention provide an integrated circuit (IC) having reduced through silicon via (TSV)-induced stresses and related IC design structures and methods. In one embodiment, the invention includes a method of designing an integrated circuit (IC) having reduced substrate stress, the method including: placing in an IC design file a plurality of through silicon via (TSV) placeholder cells, each placeholder cell having an undefined TSV orientation; replacing a first portion of the plurality of TSV placeholder cells with a first group of TSV cells having a first orientation; and replacing a second portion of the plurality of TSV placeholder cells with a second group of TSV cells having a second orientation substantially perpendicular to the first orientation, wherein TSV cells having the first orientation and TSV cells having the second orientation are interspersed to reduce a TSV-induced stress in an IC substrate.

13 Claims, 7 Drawing Sheets

(56) References Cited

U.S. PATENT DOCUMENTS

| | | | |
|---|---|---|---|
| 2008/0066023 | A1 | 3/2008 | Xu et al. |
| 2008/0127005 | A1 | 5/2008 | Lin et al. |
| 2009/0191708 | A1 | 7/2009 | Kropewnicki et al. |
| 2010/0032764 | A1 | 2/2010 | Andry et al. |
| 2010/0141272 | A1* | 6/2010 | Nurmi .................... G06F 3/045 324/654 |
| 2010/0218149 | A1* | 8/2010 | Sasaki ................. G06F 17/5022 716/106 |
| 2011/0057319 | A1* | 3/2011 | Dean, Jr. ............. G06F 17/5072 257/773 |

OTHER PUBLICATIONS

Merritt, Rick, "IBM Advances Through-Silicon Via Packaging Tech", www.eetasia.com/ART_8800461137_480300_NT_e7156731.htm, posted Apr. 17, 2007, 3 pages.

Dao et al., "Through Silicon Via Stress Characterization," May 2009, 3 pages, IEEE. 2009.

Yang et al., "TSV Stress Aware Timing Analysis with Applications to 3D-IC Layout Optimization," Jun. 2010, pp. 803-806, Design Automation Conference (DAC) 2010.

Lim, "TSV-Aware 3D Physical Design Tool Needs for Faster Mainstream Acceptance of 3D ICs," Jun. 2010, Design Automation Conference (DAC) 2010.

Van der Plas et al., "Design Issues and Considerations for Low-Cost 3D TSV IC Technology," Feb. 2010, 3 pages, 2010 IEEE International Solid-State Circuits Conference.

Merritt, Rick, "IBM Advances Through-Silicon Via Packaging Tech", www.eetasia.com/ART_8800461137_480300_NT_e7156731.htm.

Beica, et al., "Through Silicon Via Copper Electrodeposition for 3D Integration", Electronic Components and Technology Conference 2008, 58th Volume, Issue 27-30, May 2008, pp. 577-583.

Vardaman, Jan, "3-D Through Silicon Vias Become a Reality", Semiconductor International, Jun. 1, 2007, http://www.semiconductor.net/article/CA6445435.html.

Do, U.S. Appl. No. 12/555,981, Office Action Communication, May 10, 2011, 11 pages.

* cited by examiner

INTEGRATED CIRCUIT AND DESIGN STRUCTURE HAVING REDUCED THROUGH SILICON VIA-INDUCED STRESS

BACKGROUND

The present invention relates generally to integrated circuits and, more particularly, to integrated circuits (ICs) and IC design structures in which through silicon via (TSV)-induced stresses in a substrate are reduced.

In many known ICs, TSVs are placed throughout the IC in order to facilitate the connection of IC devices. Typically, such TSVs are provided in "cells" comprising one or more TSV. Each TSV in a cell includes a longitudinal axis and, where more than one TSV is included in a cell, their longitudinal axes are typically arranged in a substantially parallel direction.

For example, FIG. 1 shows a schematic representation of a portion of a surface of an IC 100 as may exist in an IC design file, wherein the IC 100 includes a substrate 10 and a plurality of TSV cells 20A-D, 22A-D, 24A-D spaced throughout the surface of IC 100. Each TSV cell includes a plurality of TSVs 30A, 32A, 34A, 36A, 38A oriented substantially parallel to each other. For the sake of simplicity, only TSVs 30A, 32A, 34A, 36A, 38A in TSV cell 20A are labeled in FIG. 1.

Typically, the orientation of TSVs in a TSV cell is referred to as "horizontal" or "vertical." Such terms are meant to refer only to the orientations of TSVs in one TSV cell as compared to an orientation of TSVs in another TSV cell. For example, in FIG. 1, the orientation of TSVs 30A, 32A, 34A, 36A, 38A of TSV cell 20A and of TSV cell 20A as a whole may be referred to as "horizontal," whereas orientation of TSV cell 20D and its TSVs may be referred to as "vertical." Other designations may be used to refer to such relative orientations, including, for example, "North-South" and "East-West."

In some ICs, whether a particular TSV cell is oriented horizontally or vertically may be of importance. In many cases, however, the orientation of particular TSV cells is not of great importance and is more likely the result of convention or simplicity in IC design. As a consequence, it is not uncommon for an IC to include multiple adjacent TSV cells having the same orientation.

For example, referring again to FIG. 1, it can be seen that TSV cells 20A, 20B, and 20C are all oriented horizontally. In addition, TSV cells 20D, 22D, and 24D, as well as TSV cells 22B and 24B are all oriented vertically. Such similar orientation of adjacent TSV cells will result in increased stresses 40, 42, 50, 52, 54 in substrate 10 caused, at least in part, by differences in the thermal expansions of substrate 10 and the materials used to fill the TSVs, typically copper, tungsten, or doped polysilicon. In effect, the orientation of adjacent TSVs in the same direction acts much like a wedge within substrate 10 as the TSV materials thermally expand more quickly and/ or to a greater extent than the material of substrate 10.

SUMMARY OF THE INVENTION

A first aspect of the invention provides a method of designing an integrated circuit (IC) having reduced substrate stress, the method comprising: placing in an IC design file a plurality of through silicon via (TSV) placeholder cells, each placeholder cell having an undefined TSV orientation; replacing a first portion of the plurality of TSV placeholder cells with a first group of TSV cells having a first orientation; and replacing a second portion of the plurality of TSV placeholder cells with a second group of TSV cells having a second orientation substantially perpendicular to the first orientation, wherein TSV cells having the first orientation and TSV cells having the second orientation are interspersed to reduce a TSV-induced stress in an IC substrate.

A second aspect of the invention provides an integrated circuit comprising: a substrate; and a plurality of through silicon vias (TSVs) in the substrate, the plurality of TSVs comprising: a first portion having a first orientation; and a second portion having a second orientation, wherein the first portion and the second portion are distributed within the substrate to reduce TSV-induced stresses in the substrate.

A third aspect of the invention provides a non-transitory computer-readable medium storing code representative of a design structure realized upon execution of the code by a computer system, the code representative of the design structure including code representing a circuit, the code comprising: code representing an integrated circuit (IC), the IC including: a substrate; and a plurality of through silicon vias (TSVs) in the substrate, the plurality of TSVs comprising: a first portion having a first orientation; and a second portion having a second orientation, wherein the first portion and the second portion are distributed within the substrate to reduce TSV-induced stresses in the substrate.

A fourth aspect of the invention provides a method comprising: encoding code representative of a design structure stored on a non-transitory computer readable medium of a source computer system into a set of data signals; and providing the set of data signals for use on a destination computer system distinct from the source computer system, the code representative of the design structure including code representing a circuit, the code comprising: code representing an integrated circuit (IC), the IC including: a substrate; and a plurality of through silicon vias (TSVs) in the substrate, the plurality of TSVs comprising: a first portion having a first orientation; and a second portion having a second orientation substantially perpendicular to the first orientation, wherein the first portion and the second portion are distributed within the substrate to reduce TSV-induced stresses in the substrate.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements among the drawings.

DETAILED DESCRIPTION OF THE INVENTION

Figure 2:
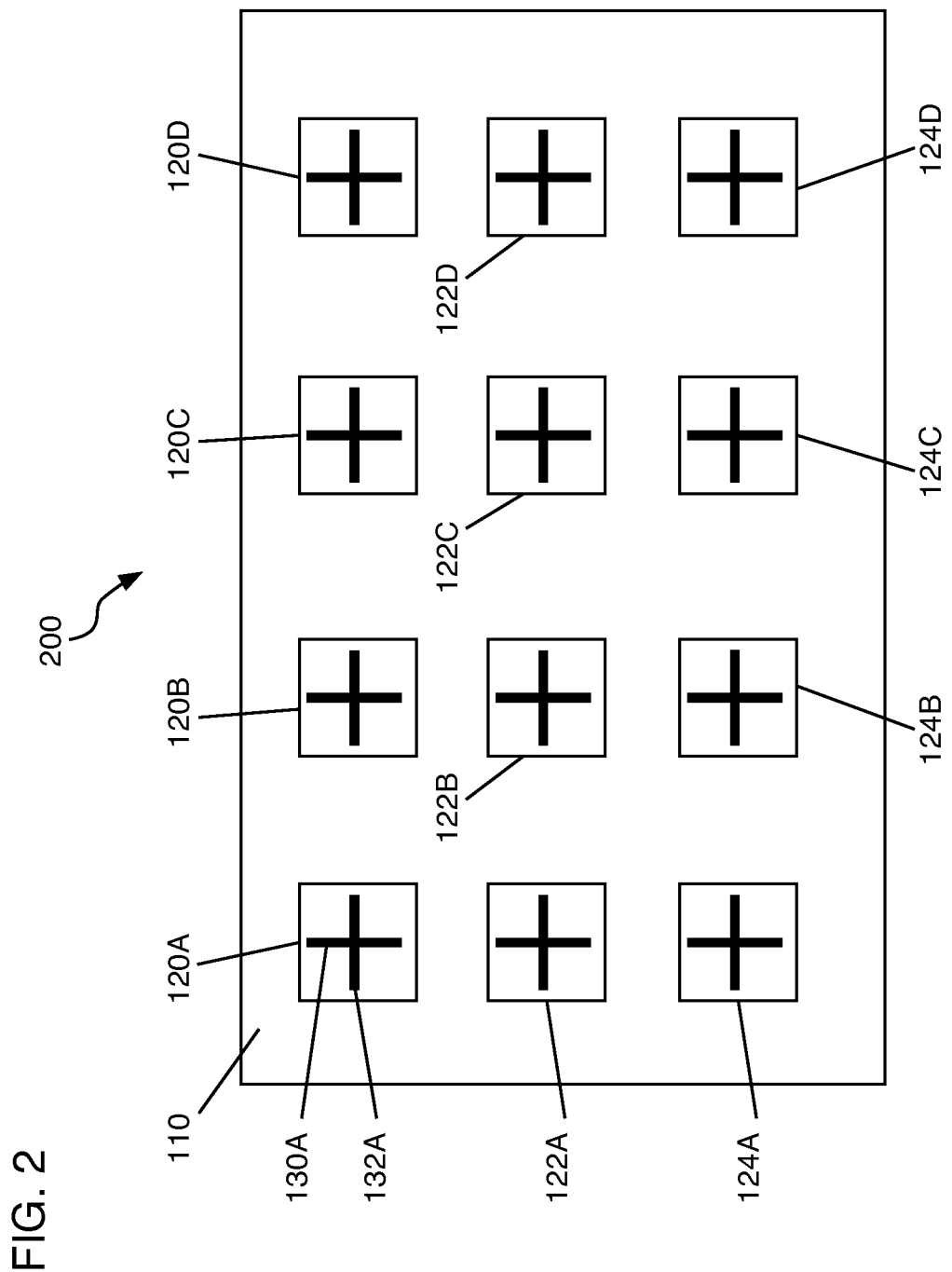
FIGS. 2-5 show schematic views of ICs according to embodiments of the invention.

FIG. 2 shows a schematic representation of a portion of an IC 200, as may exist in an IC design file. IC 200 includes a substrate 110 upon which are placed a plurality of TSV placeholder cells 120A-D, 122A-D, 124A-D. Each TSV placeholder cell 120A-D, 122A-D, 124A-D includes a vertical TSV 130A and a horizontal TSV 132A. For the sake of simplicity, only TSVs 130A, 132A of TSV placeholder cell 120A are labeled. As can be seen in FIG. 2, the horizontal-vertical orientation of each TSV placeholder cell 120A-D, 122A-D, 124A-D is ambiguous, as each has substantially equal horizontal and vertical components.

Often, substrate 110 includes silicon or germanium. Other suitable materials include, for example, silicon germanium, silicon carbide, and materials consisting essentially of one or more III-V compound semiconductors having a composition defined by the formula $Al_{X1}Ga_{X2}In_{X3}As_{Y1}P_{Y2}N_{Y3}Sb_{Y4}$, where X1, X2, X3, Y1, Y2, Y3, and Y4 represent relative proportions, each greater than or equal to zero and X1+X2+X3+Y1+Y2+Y3+Y4=1 (1 being the total relative mole quantity). Other suitable substrates include II-VI compound semiconductors having a composition $Zn_{A1}Cd_{A2}Se_{B1}Te_{B2}$, where A1, A2, B1, and B2 are relative proportions each greater than or equal to zero and A1+A2+B1+B2=1 (1 being a total mole quantity).

As noted above, TSVs are typically filled with a filler material, such as copper, tungsten, or doped polysilicon. Other materials suitable for filling TSVs according to embodiments of the invention include other conducting and semi-conducting materials.

Referring again to FIG. 2, in designing an IC, a designer may position a plurality of TSV placeholder cells 120A-D, 122A-D, 124A-D across IC 200 to indicate where connections between IC devices will be made. As noted above, the orientation of a particular TSV or TSV cell is typically of little or no importance, as connections between IC devices can often be made horizontally or vertically.

TSV placeholder cells 120A-D, 122A-D, 124A-D are, however, mere placeholders. According to embodiments of the invention, TSV placeholder cells 120A-D, 122A-D, 124A-D are replaced in the IC design file by TSV cells arranged such that their orientations reduce or eliminate TSV-induced stresses in ICs prepared from the IC design file.

Figure 1:
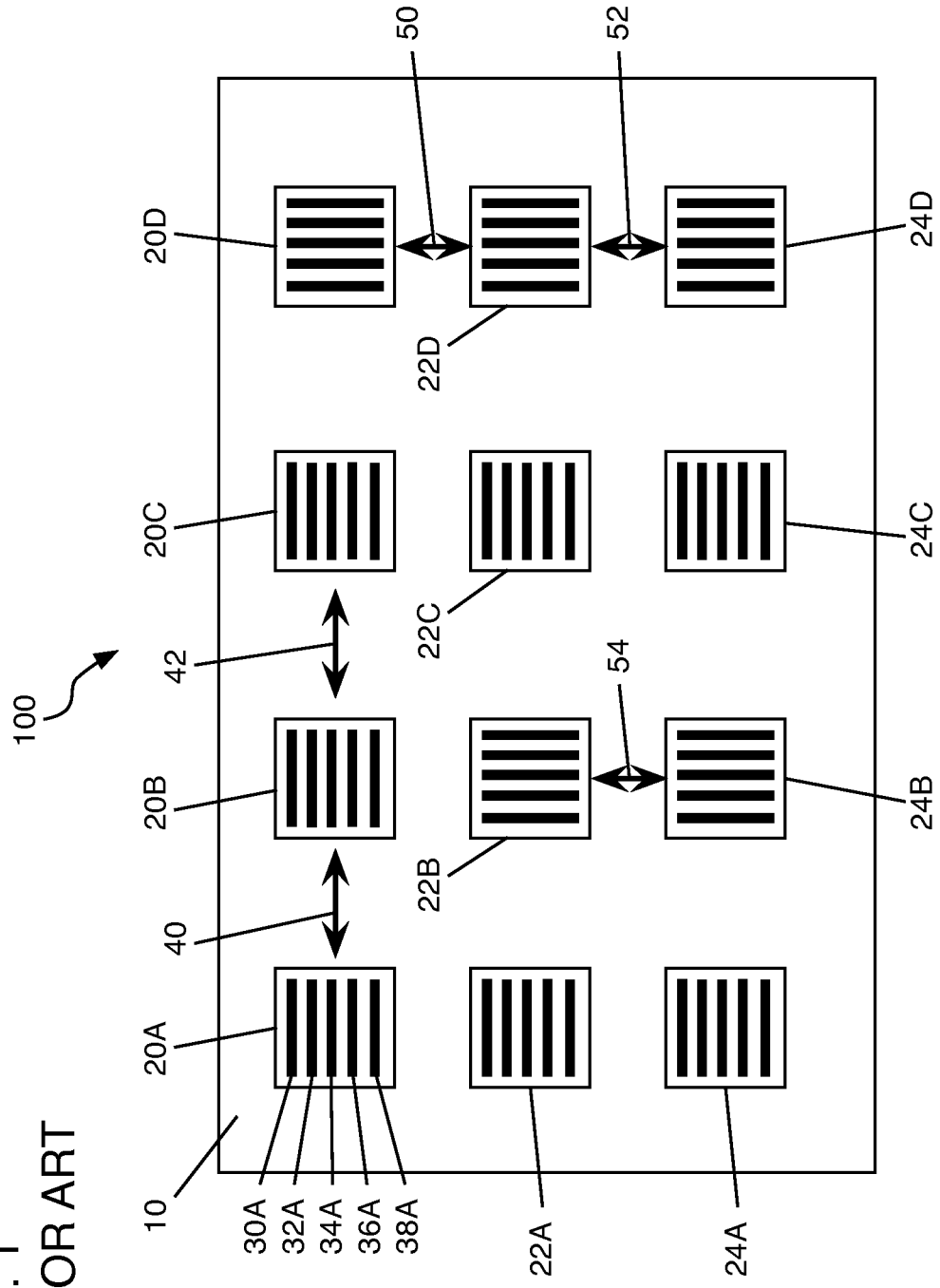
FIG. 1 shows a schematic view of a known integrated circuit (IC).
Figure 3:
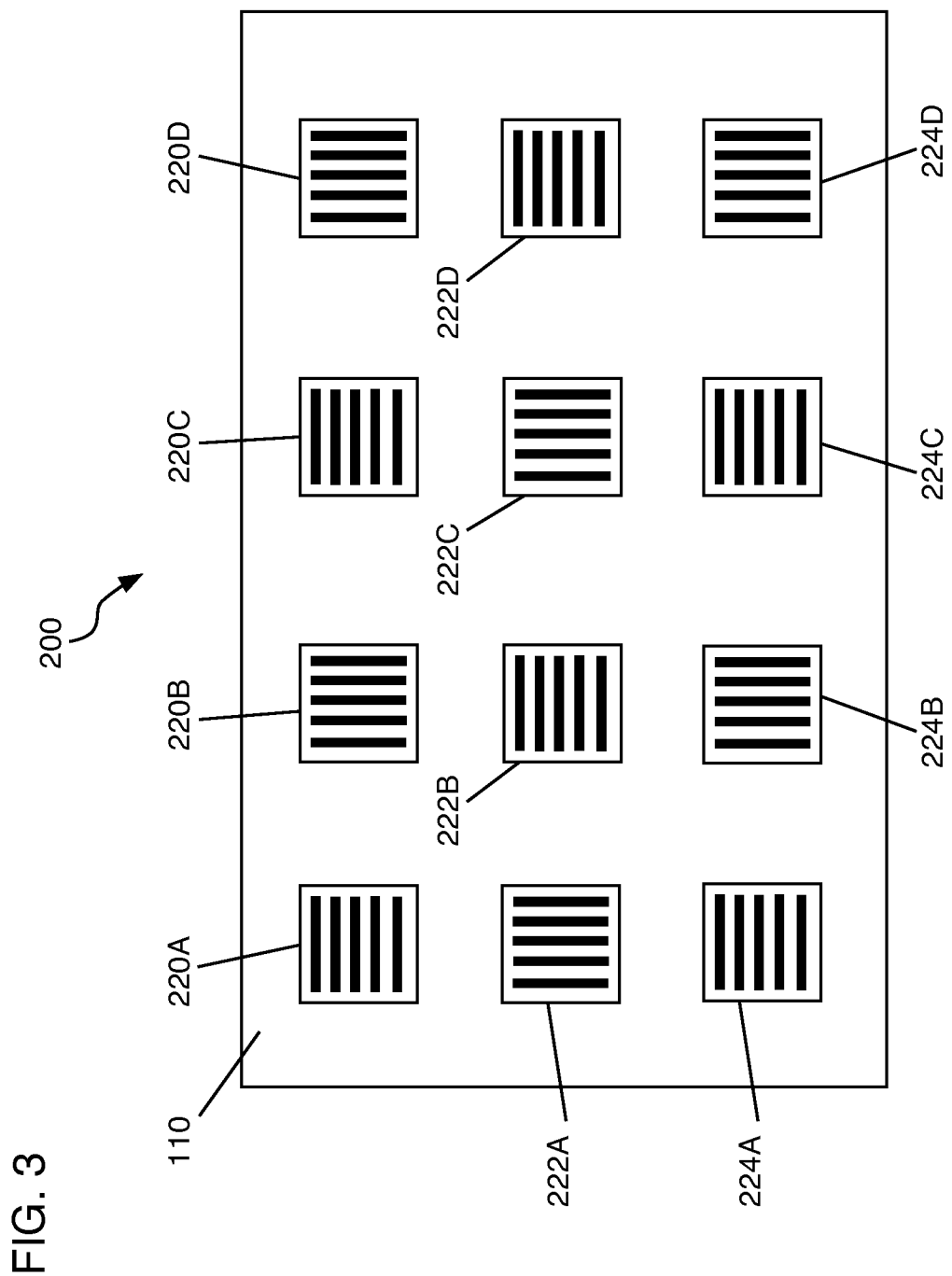

For example, FIG. 3 shows IC 200 in which half of the TSV placeholder cells have been replaced by horizontally-oriented TSV cells 220A, 220C, 222B, 222D, 224A, 224C and the other half replaced by vertically-oriented TSV cells 220B, 220D, 222A, 222C, 224B, 224D. As such, adjacent TSV cells have different orientations, reducing the TSV-induced stresses in substrate 110 of IC 200 in FIG. 1.

In replacing TSV placeholder cells with TSV cells, as in FIG. 3, an algorithm may be employed to optimize orientations among the TSV cells and their placement relative to other TSV cells. In some embodiments, horizontally-oriented TSV cells will comprise between about 40% and about 60% of the TSV placeholder cells replaced, and vertically-oriented TSV cells will comprise the remainder, or vice versa. That is, in order to ensure that all or substantially all of the TSV cells have adjacent cells having a different orientation, TSV cells of each orientation should comprise about half of the total TSV cells. The precise proportions will vary, of course, based on the placements of TSV placeholder cells in IC 200. For example, TSV cells that will be isolated or more distantly placed from other TSV cells may not need to have an orientation different from their nearest neighboring TSV cells if the effect of their similar orientations will be negligible in terms of TSV-induced stresses in the substrate.

Figure 4:
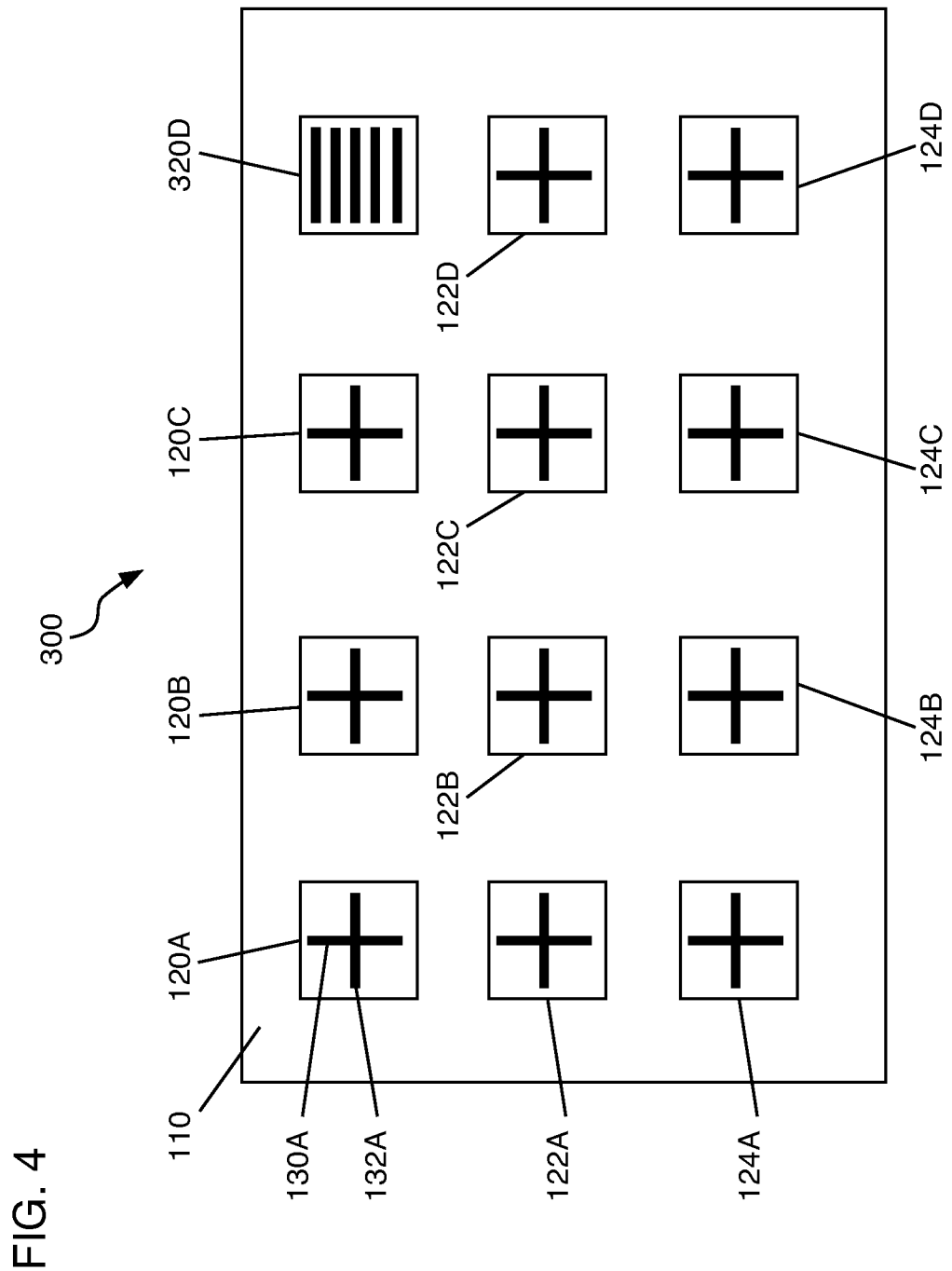
Figure 5:
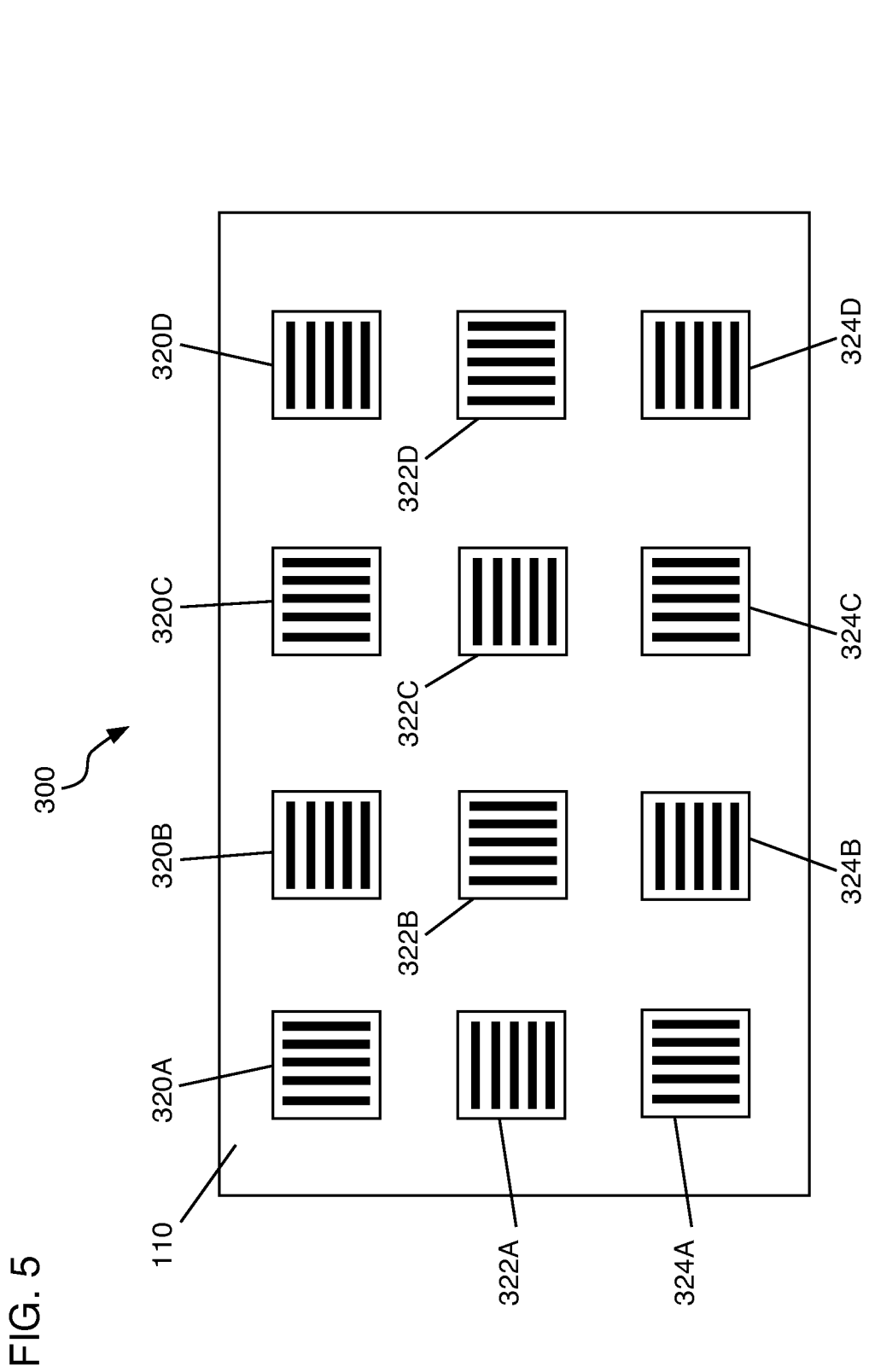

In some cases, of course, it may be necessary for an IC designer to specify that a particular TSV cell have a particular orientation. For example, in FIG. 4, it may be necessary, based on the IC devices to be connected, that TSV cell 320D have the horizontal orientation depicted. In such a case, the orientations of other TSV cells may be determined, when replacing TSV placeholder cells, such that TSV cell 320D maintains its horizontal orientation while orienting other TSV cells to reduce TSV-induced stresses, as described above. FIG. 5 shows IC 300 following such replacement of TSV placeholder cells with TSV cells 320A-C, 322A-D, 324A-D.

Figure 6:
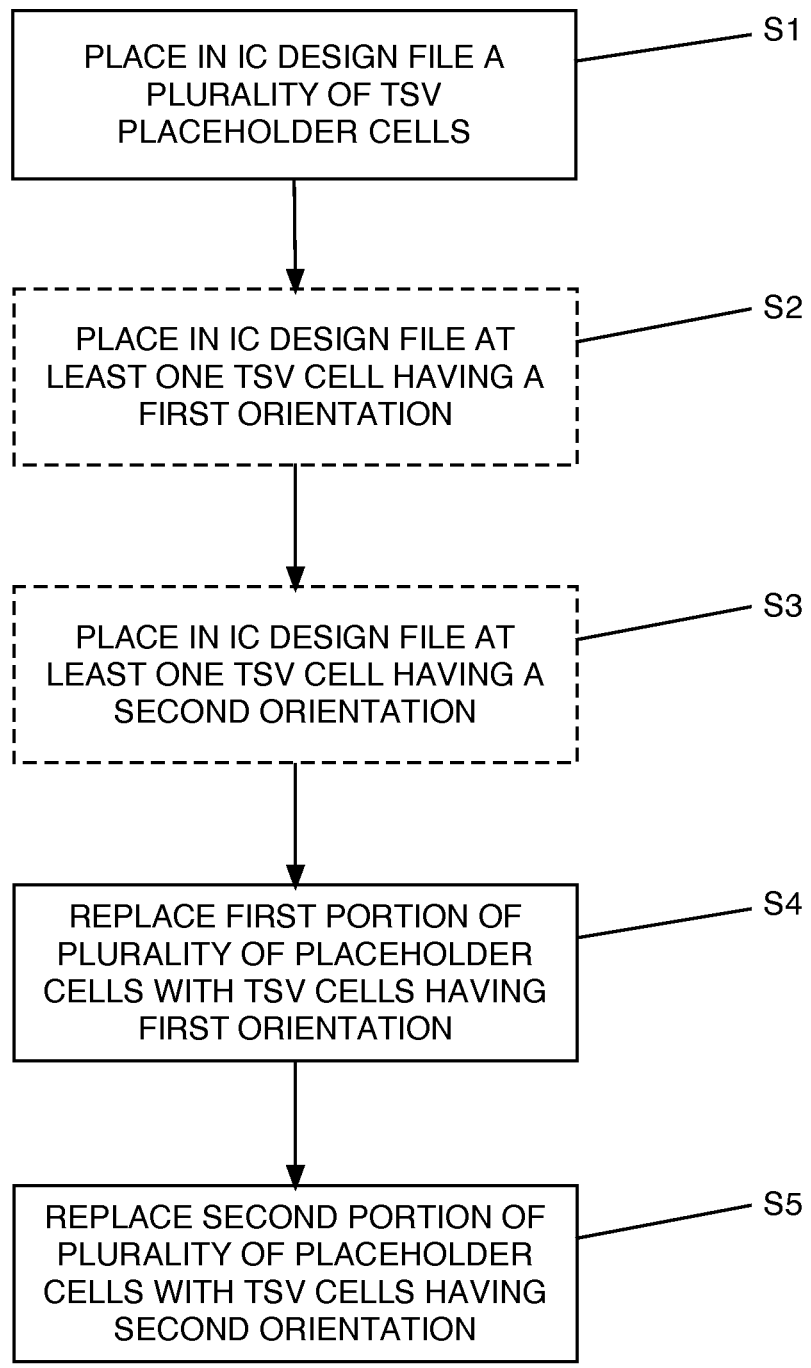
FIG. 6 shows a flow diagram of a method according to an embodiment of the invention.

FIG. 6 shows a flow diagram of a method according to an embodiment of the invention. At S1, a plurality of TSV placeholder cells are placed in an IC design file. Suitable IC design files include, for example, map files, GDSII (i.e., GDS2) data files, GL1 data files, and OASIS data files. Other suitable file types will be apparent to one skilled in the art.

At S2, at least one TSV cell having a first orientation may optionally be placed in the IC design file, as described above with respect to FIG. 4. Similarly, at S3, at least one TSV cell having a second orientation may optionally be placed in the IC design file. As above, the first and second orientations refer to relative orientations of TSV cells, e.g., horizontal and vertical orientations.

At S4, a first portion of the plurality of TSV placeholder cells placed at S1 is replaced with TSV cells having a first orientation. In some embodiments, the first orientation of the TSV cells is substantially the same as the first orientation of the at least one TSV cell optionally placed at S2.

At S5, a second portion of the plurality of TSV placeholder cells placed at S1 is replaced with TSV cells having a second orientation. In some embodiment, the second orientation of the TSV cells is substantially the same as the second orientation of the at least one TSV cell optionally placed at S3.

Figure 7:
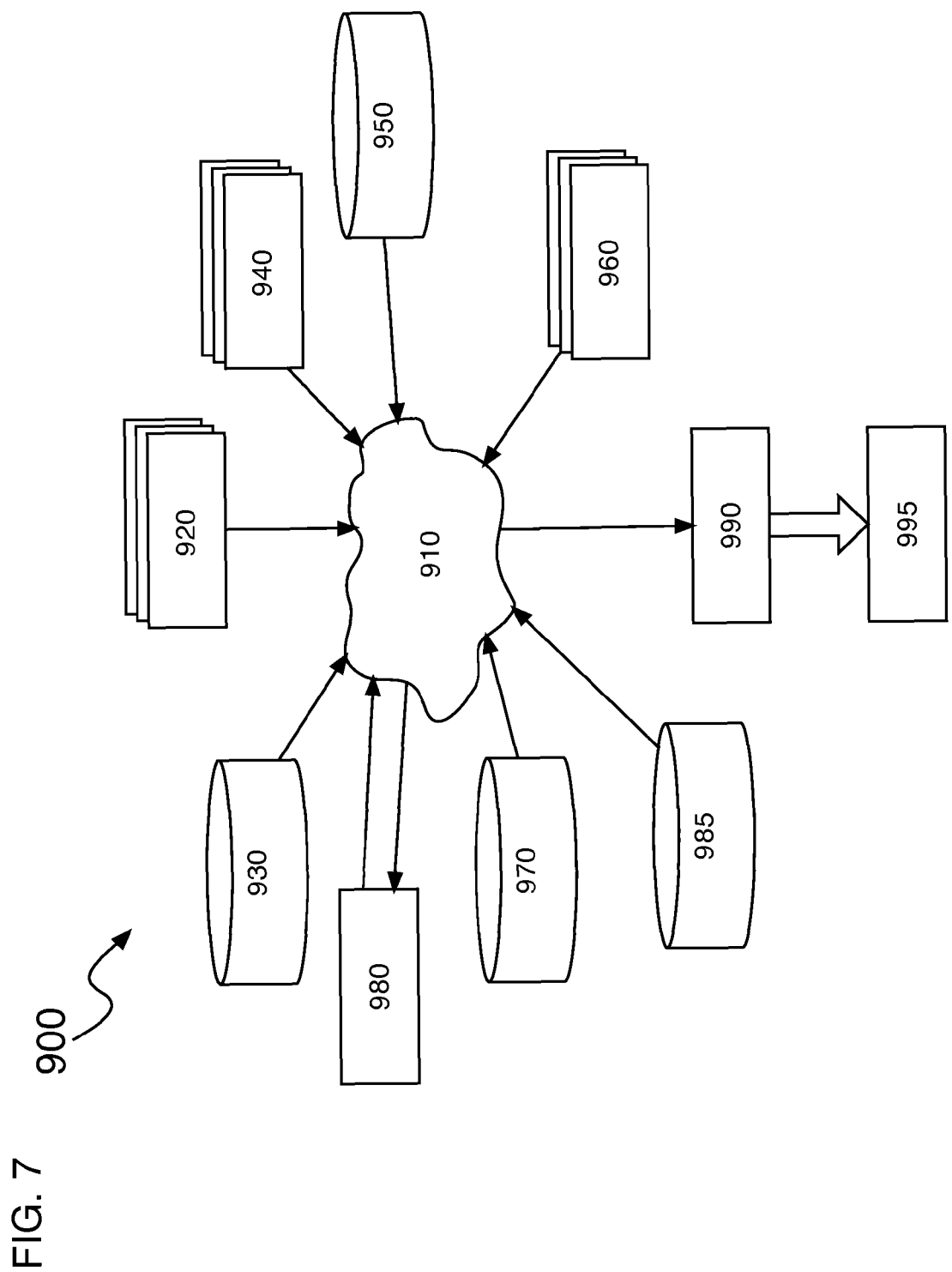
FIG. 7 shows a schematic representation of an IC design flow according to an embodiment of the invention.

FIG. 7 shows a block diagram of an example design flow 900. Design flow 900 may vary depending on the type of IC (e.g., 200, 300 in FIGS. 3 and 5, respectively) being designed. For example, a design flow 900 for building an application specific IC (ASIC) may differ from a design flow 900 for designing a standard component. Design structure 920 is preferably an input to a design process 910 and may come from an IP provider, a core developer, or other design company or may be generated by the operator of the design flow, or from other sources. Design structure 920 comprises an IC in the form of schematics or a hardware description language (HDL) (e.g., Verilog, VHDL, C, etc.). Design structure 920 may be contained on one or more machine readable media. For example, design structure 920 may be a text file or a graphical representation of an IC. Design process 910 preferably synthesizes (or translates) an IC into a netlist 980, where netlist 980 is, for example, a list of wires, transistors, logic gates, control circuits, I/O, models, etc. that describes the connections to other elements and circuits in an integrated circuit design and recorded on at least one non-transitory computer-readable medium. This may be an iterative process in which netlist 980 is resynthesized one or more times depending on design specifications and parameters for the circuit.

Design process 910 may include using a variety of inputs, including, for example, inputs from library elements 930 which may house a set of commonly used elements, circuits, and devices, including models, layouts, and symbolic representations, for a given manufacturing technology (e.g., different technology nodes, 32 nm, 45 nm, 90 nm, etc.), design specifications 940, characterization data 950, verification data 960, design rules 970, and test data files 985 (which may include test patterns and other testing information). Design process 910 may further include, for example, standard circuit design processes such as timing analysis, verification, design rule checking, place and route operations, etc. One of ordinary skill in the art of IC design can appreciate the extent of possible electronic design automation tools and applications used in design process 910 without deviating from the scope and spirit of the disclosure. The design structure of the disclosure is not limited to any specific design flow.

Design process 910 preferably translates an embodiment of the disclosure as shown in FIGS. 3 and 5 along with any additional IC design or data (if applicable), into a second design structure 990. Design structure 990 resides on a non-transitory computer-readable storage medium in a data format used for the exchange of layout data of ICs (e.g. information stored in a map file, a GDSII (GDS2) data file, a GL1 data file, an OASIS data file, or any other suitable format for storing such design structures). Second design structure 990 may comprise information such as, for example, test data files, design content files, manufacturing data, layout parameters, wires, levels of metal, vias, shapes, data for routing through the manufacturing line, and any other data required by a semiconductor manufacturer to produce an embodiment of the disclosure as shown in FIGS. 3 and 5. Second design structure 990 may then proceed to a stage 995 where, for example, design structure 990 proceeds to tape-out, is released to manufacturing, is released to a mask house, is sent to another design house, is sent back to the customer, etc.

The design structure, structures and methods as described above are used in the fabrication of IC chips. The resulting IC chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes IC chips, ranging from toys and other low-end applications to advanced computer products having a display, a keyboard or other input device, and a central processor.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. An integrated circuit comprising:
 a substrate; and
 a plurality of through silicon via (TSV) cells in the substrate and each arranged in a plurality of rows each having a shared horizontal axis and a plurality of columns each having a shared vertical axis, each of the plurality of TSV cells including a plurality of TSVs each having a substantially same size and a substantially same orientation, the plurality of TSV cells comprising:
 a first group of TSV cells, the through silicon vias (TSVs) of which have a first orientation; and
 a second group of TSV cells, the TSVs of which have a second orientation substantially perpendicular to the first orientation,
 wherein each of the TSV cells adjacent to a first TSV cell of the first group is a TSV cell of the second group, wherein each adjacent TSV cell is separated from the first TSV cell by less than a threshold distance independent from a size of the first TSV cell, and wherein an arrangement of adjacent TSV cells in the integrated circuit reduces TSV-induced stresses in the substrate between the first TSV cell of the first group and each of the adjacent TSV cells of the second group.

2. The integrated circuit of claim 1, wherein the first group of TSV cells comprises between about 40% and about 60% of the TSVs of the integrated circuit.

3. The integrated circuit of claim 1, wherein the second group of TSV cells comprises between about 40% and about 60% of the TSVs of the integrated circuit.

4. The integrated circuit of claim 1, wherein each of the first group of TSV cells and the second group of TSV cells comprises about 50% of the TSVs of the integrated circuit.

5. The integrated circuit of claim 1, wherein each TSV cell adjacent to each TSV cell of the first group includes TSVs having the orientation of the second group.

6. The integrated circuit of claim 1, wherein the first orientation of at least one of the TSVs in the first group is predetermined in a preliminary integrated circuit design.

7. A non-transitory computer-readable medium storing code representative of a design structure realized upon execution of the code by a computer system, the code representative of the design structure including code representing a circuit, the code comprising:
 code representing an integrated circuit (IC), the IC including:
 a substrate; and
 a plurality of through silicon via (TSV) cells in the substrate and each arranged in a plurality of rows each having a shared horizontal axis and a plurality of columns each having a shared vertical axis, the plurality of TSV cells each including a plurality of through silicon vias (TSVs) each having a substantially same size and a substantially same orientation, the plurality of TSV cells comprising:
 a first group of TSV cells, the TSVs of which have a first orientation; and
 a second group of TSV cells, the TSVs of which have a second orientation substantially perpendicular to the first orientation,
 wherein each of the TSV cells adjacent to a first TSV cell of the first group is a TSV cell of the second group, wherein each adjacent TSV cell is separated from the first TSV cell by less than a threshold distance independent from a size of the first TSV cell, and wherein an arrangement of adjacent TSV cells in the integrated circuit reduces TSV-induced stresses in the substrate between the first TSV cell of the first group and each of the adjacent TSV cells of the second group.

8. The non-transitory computer-readable medium of claim 7, wherein the first group of TSV cells comprises between about 40% and about 60% of the TSVs of the integrated circuit.

9. The non-transitory computer-readable medium of claim 7, wherein the second group of TSV cells comprises between about 40% and about 60% of the TSVs of the integrated circuit.

10. The non-transitory computer-readable medium of claim 7, wherein each of the first group of TSV cells and the second group of TSV cells comprises about 50% of the TSVs of the integrated circuit.

11. The non-transitory computer-readable medium of claim 7, wherein the code representing the IC includes a schematic.

12. The non-transitory computer-readable medium of claim 7, wherein the code representing the IC is written in a hardware description language.

13. The non-transitory computer-readable medium of claim 7, wherein the first orientation of at least one of the TSVs in the first group is predetermined in a preliminary integrated circuit design.

* * * * *